United States Patent [19]

Blount

[11] 4,346,185

[45] Aug. 24, 1982

[54] PROCESS FOR THE PRODUCTION OF ALKALI METAL UNSATURATED POLYESTER SILICATE RESINOUS PRODUCTS

[76] Inventor: David H. Blount, 5450 Lea St., San Diego, Calif. 92105

[21] Appl. No.: 280,782

[22] Filed: Jul. 6, 1981

Related U.S. Application Data

[63] Continuation-in-part of Ser. No. 122,015, Feb. 19, 1980, which is a continuation-in-part of Ser. No. 10,061, Feb. 7, 1979, Pat. No. 4,200,697, which is a continuation-in-part of Ser. No. 794,915, May 9, 1977, Pat. No. 4,125,498, which is a continuation-in-part of Ser. No. 653,727, Jan. 30, 1976, abandoned, which is a continuation-in-part of Ser. No. 562,201, Apr. 14, 1975, abandoned.

[51] Int. Cl.$^3$ .............................................. C08L 67/00
[52] U.S. Cl. ........................................ 524/5; 524/433; 524/444; 528/300; 528/303; 528/304; 528/305; 528/306; 528/425; 525/444; 525/446
[58] Field of Search ................ 525/444, 446; 528/300, 528/303, 304, 305, 306, 425; 524/5, 433, 444

[56] References Cited

U.S. PATENT DOCUMENTS

| | | | |
|---|---|---|---|
| 4,125,498 | 11/1978 | Blount | 528/14 |
| 4,200,697 | 4/1980 | Blount | 521/83 |
| 4,282,129 | 8/1981 | Blount | 525/446 |

*Primary Examiner*—Melvyn I. Marquis

[57] ABSTRACT

Alkali metal unsaturated polyester silicate resinous products are produced by mixing a polyhydroxy organic compound, an alkali metal silicate and an unsaturated polycarboxylic acid, then heating the mixture to a temperature between the melting point of the polycarboxylic acid and the boiling temperature of the polyol while agitating until the reaction is complete. The products may be used in laminates and as coating agents.

16 Claims, No Drawings

PROCESS FOR THE PRODUCTION OF ALKALI METAL UNSATURATED POLYESTER SILICATE RESINOUS PRODUCTS

CROSS-REFERENCE TO RELATED CO-PENDING APPLICATION

This application is a continuation-in-part of U.S. patent application Ser. No. 122,015 filed Feb. 19, 1980, which is a continuation-in-part of U.S. patent application, Ser. No. 10,061, filed Feb. 7, 1979, now Pat. No. 4,200,697, which is a continuation-in-part of U.S. patent application, Ser. No. 794,915, filed May 9, 1977, now U.S. Pat. No. 4,125,498, which is a continuation-in-part of U.S. patent application, Ser. No. 653,727, filed Jan. 30, 1976, now abandoned, which is a continuation-in-part of U.S. patent application, Ser. No. 562,201, filed Apr. 14, 1975, now abandoned.

BACKGROUND OF THE INVENTION

This invention relates to a process for the production of alkali metal unsaturated polyester silicate resinous products by chemically reacting a polyhydroxyl organic compound, an unsaturated polycarboxylic acid compound and/or an unsaturated polycarboxylic acid anhydride and an alkali metal silicate.

For the purpose of this invention, the products produced by this instant process will be named alkali metal unsaturated polyester silicate resinous products.

The alkali metal silicates will react chemically with both the polyhydroxyl organic compounds and the polycarboxylic acid compounds by heating and slowly adding an inorganic or an organic acid. Either saturated and/or unsaturated polyfunctional acids and alcohols may be reacted with alkali metal silicate to eventually cross-linked, three-dimensional esters. The unsaturated polyester silicate may be cured with a peroxide initiator. The polyfunctional acids and alcohols may be halogenated and may be aliphatic or aromatic.

The alkali metal unsaturated polyester silicate resinous products may be used to make polyester silicate resinous products which may be utilized in coatings for wood, metal, linoleum, leather, fabrics and rubber. They may be utilized in paints, lacquers, metal primers, caulking compounds and water-emulsion paints. They may be copolymerized with a vinyl monomer to produce hard, solid, useful objects, or they may be used in conjunction with a reinforcing filler, such as glass fiber, paper or cloth to produce a laminate of outstanding strength and durability. They may be used as a molding powder, as an adhesive and as impregnants. They may be chemically reacted with polyisocyanates to produce polyurethane silicate resin and foams.

The alkali metal unsaturated silicate resinous products may be utilized to produce unsaturated polyester silicate resinous products and polyurethane silicate resinous products and foams. These foams may be used for thermal and sound insulation in homes, commercial buildings, airplanes, automobiles, home appliances, and packaging. They are soluble in solvents and may be used as adhesives and coating agents for wood, metal and plastics.

Alkali metal unsaturated polyester silicate resinous products are produced by reacting the following components:
(a) an alkali metal silicate;
(b) a polyhydroxyl organic compound;
(c) an unsaturated polycarboxylic acid, an unsaturated polycarboxylic acid anhydride and mixtures thereof; one of the organic components must be unsaturated.

An unsaturated polyester silicate resinous product may be produced by reacting the following components:
(a) an alkali metal silicate;
(b) a polyhydroxyl organic compound;
(c) a polycarboxylic acid and/or a polycarboxylic acid anhydride; one of the organic components must be unsaturated.
(d) a salt-forming compound.

Component (a)

Any suitable alkali metal compound may be used in this invention, such as sodium silicate, potassium silicate, lithium silicate and mixtures thereof.

Sodium silicate is the preferred alkali metal silicate.

Component (b)

Suitable polyhydric alcohols include, but are not limited to, ethylene glycol; propylene-1,2- and -1,3-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methyl-propane-1,3-diol; diethylene glycol; triethylene glycol; tetraethylene glycol; polyethylene glycols; dipropylene glycol; polypropylene glycols; dibutylene glycol and polybutylene glycols. The unsaturated polyester resins may contain lactones such as $\epsilon$-caprolactone, or hydrocarboxylic acids such as $\omega$-hydroxy-caproic acid. Polyethers containing 2 hydroxyl groups may be used in production of unsaturated polyester resins and may be prepared, e.g., by the polymerization of epoxides, e.g., ethylene oxide, propylene oxide, butylene oxide, tetrahydrofuran, styrene oxide or epichlorohydrin, each with itself, e.g., in the presence of $BF_3$, or by addition of these epoxides, optionally as mixtures or successively, to starting components such as alcohols or amines, e.g., water; ethylene glycol; propylene-1,3- or -1,2-glycol; trimethylol propane; 4,4'-dihydroxydiphenylpropane; aniline; ammonia, ethanolamine or ethylenediamine. The polyesters may be modified with vinyl polymers such as those which may be obtained by polymerizing styrene or acrylonitrile in the presence of polyethers.

Suitable unsaturated alcohols such as allyl alcohol may be reacted with dibasic acids such as phthalic anhydride, succinic acid, maleic acid, maleic anhydride, itaconic acid and fumaric acid to produce allyl esters which may be polymerized alone or with other polymerizing monomers. Allyl esters such as diethylene glycol bis(allyl carbonate), diallyl maleate, diallyl fumarate, diallyl phthalate, diallyl benzene phosphonate, allyl itaconate and methallyl methacrylate may be used in this invention. Triallyl cyanurate may be reacted with unsaturated polyester resins to produce resins, and may be used as the polymerizing monomer.

Other unsaturated alcohols may be reacted with dibasic acids; these include other polymeric allyl-type alcohols which are alcohols having a double bond of aliphatic character between two carbon atoms, one of which is attached directly to a saturated carbon atom, which, in turn, is attached directly to an alcoholic hydroxyl group, as represented by the general structural formula:

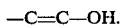

Alcohols embodying this structure may properly be termed "beta, gamma-olefinic monohydric alcohols". Allyl-type alcohols having a terminal methylene group attached by an olefinic double bond to a carbon atom which is attached directly to a saturated carbinol carbon are represented by the formula:

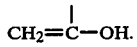

$$CH_2=\overset{|}{C}-OH.$$

Component (c)

The polycarboxylic acid may be aliphatic, cycloaliphatic, aromatic and/or heterocyclic and may be substituted, e.g., with halogen atoms and may be unsaturated. Examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric acid fatty acid such as oleic acid, optionally mixed with monomeric fatty acids, dimethylterephthalate and bis-glycol terephthalate.

Long-chain unsaturated alkali metal polyester silicate resins may be made from dibasic acids and dihydric alcohols. Either the dibasic acid or the dihydric alcohol may be unsaturated. Usually a combination of unsaturated and saturated dibasic acids and dihydric alcohols is used to produce the alkali metal unsaturated polyester silicate resinous products. Instead of dibasic acids, the corresponding polycarboxylic acid esters of lower alcohols or their mixtures may be used for preparing the alkali metal unsaturated polyester silicate resins.

Suitable dibasic acids may be aliphatic, cycloaliphatic, aromatic and/or heterocyclic and may be substituted, e.g., with halogen atoms. Examples of the dibasic acid and corresponding acid anhydride include, but are not limited to, succinic acid, adipic acid, suberic acid, azelaic acid, phthalic acid, sebacic acid, isophthalic acid, trimellitic acid, phthalic acid anhydride, tetrahydrophthalic acid anhydride, hexahydrophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bis-glycol terephthalate. An unsaturated dibasic acid such as maleic acid, maleic acid anhydride, fumaric acid, itaconic acid or mixtures thereof must be included in the production of unsaturated alkali metal polyester silicate resinous products, except when an unsaturated alcohol is used. The unsaturated polycarboxylic acid or polycarboxylic acid anhydride may be replaced with up to 75% by weight with a saturated polycarboxylic acid, polycarboxylic acid anhydride, a linear organic carbonate or a mixture thereof.

Component (d)

Any suitable salt-forming compound may be utilized to react with the alkali metal radical in the alkali metal polyester silicate to produce polyester silicate resinous products. Suitable salt-forming compounds include mineral acids such as sulfuric acid, hydrochloric acid, phosphoric acid, and nitric acid, organic acids, such as acetic acid, hydrogen-containing acid salts such as sodium hydrogen sulfate and potassium hydrogen sulfate, organic acid halides, organic acid sulfates and mixtures thereof.

Component (e)

Any suitable polymerizing monomer may be used with the unsaturated polyester resin such as, but not limited to, vinyl monomers, allyl esters, triallyl cyanurate and mixtures thereof.

Styrene is the preferred polymerizing monomer and may be used alone or in combination with vinyl acetate. Other vinyl monomers may be used such as acrylic acid compounds and esters, vinyl toluene, divinyl benzene, acrylonitrile, methacrylonitrile, etc.

Component (f)

Activators and promoters, used in conjunction with the initiators such as cobalt which, in the form of its ethyl hexanoate or naphthene salt, is a good, general-purpose activator for use with ketone peroxides, may be added to the alkali metal unsaturated polyester silicate resin. Concentration as low as 30 ppm of cobalt metal will activate a system. Promoters may be added to the unsaturated polyester silicate resins such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the alkali metal unsaturated polyester silicate resin.

An inhibitor, such as p-tert-butyl catechol, hydroquinone, p-nitrose dimethylaniline or similar compounds which will increase the lifetime of the alkali metal unsaturated polyester silicate resin, may be added to the alkali metal unsaturated polyester silicate resin.

Any suitable initiator which will promote the copolymerization of a solution of an unsaturated linear polymer in a liquid monomer may be used in this invention. The controlled polymerization of alkali metal unsaturated polyester silicate monomer mixture, in order to yield fully cured solids, usually requires the use of an initiator.

Any suitable free-radical initiator, such as organic and inorganic peroxides, azo compounds, alkali metal persulfates, ammonium persulfate and mixtures thereof, may be used. The fact that the action of organic peroxide can be modified by activators and promoters, plus their ready availability at reasonable cost, makes them preferable in this invention. Thermal and photopolymerization may be used in certain cases.

Suitable organic peroxide initiators include, but are not limited to, acetyl benzoyl peroxide, peracetic acid, methyl ethyl ketone peroxide, cyclohexanone peroxide, cyclohexyl hydroperoxide, 2,4-dichlorobenzoyl peroxide, cumene hydroperoxide, tert-butyl hypoperoxide, methyl amyl ketone peroxide, lauryl peroxide, benzoyl peroxide, tert-butyl perbenzoate, di-tert-butyl diperphthalate and mixtures thereof. Up to 1% by weight of a peroxide initiator, percentage based on the weight of the alkali metal unsaturated polyester silicate-vinyl monomer mixture.

Promoters used with acyl peroxide include tertary dialkyl aryl amines, such as diethyl aniline, and aliphatic thiols, as for example, lauryl mercaptan. Concentrations used are most often in the range of 0.05% to 0.5% of active substance. Promoters usually are strong reducing agents and initiators are strong oxidizing agents.

Suitable alkali metal persulfates include potassium and sodium persulfate. Redox systems may also be utilized in this invention.

Surface-active additives (emulsifiers) may also be used according to the invention. Suitable emulsifiers are, e.g., the sodium salts of ricinoleic sulphonates or of fatty acid, or salts of fatty acids with amines, e.g., oleic acid diethylamine or stearic acid diethanolamine. Other surface-active additives are alkali metal or ammonium salts of sulphonic acids, e.g., dodecylbenzine sulphonic acid or dinaphthyl methane disulphonic acid; or of fatty acids, e.g., ricinoleic acid, or of polymeric fatty acids. Surface active additives are added up to 20% by weight based on the reaction mixture.

The object of the present invention is to provide a novel process to produce alkali metal unsaturated polyester silicate resinous products. Another object is to produce alkali metal unsaturated polyester silicate resinous products which will react with a salt-forming compound to produce unsaturated polyester silicate resinous products. A further object is to produce alkali metal unsaturated polyester silicate resinous products which will react with polyisocyanates to produce resinous and foamed products that may be used as coating agents and thermal- and sound-insulation materials. Another object is to produce polyurethane silicate foamed products which have excellent flame-retardant properties.

DETAILED DESCRIPTION OF THE INVENTION

I have discovered that an alkali metal unsaturated polyester silicate resinous product may be produced by reacting an alkali metal silicate, a polyhydroxy organic compound and a polycarboxylic acid and/or a polycarboxylic anydride providing that one of the polyhydroxy organic compound or polycarboxylic acid compound is unsaturated.

The preferred method is to slowly add Component (a), an alkali metal silicate to Component (b), a polyhydroxyl organic compound and Component (c), a polycarboxylic acid and/or a polycarboxylic anhydride, while heating the mixture to a temperature between the melting temperature of the polycarboxylic acid and the boiling temperature of the polyhydroxyl organic compound while agitating for 20 to 90 minutes, thereby producing an alkali metal polyester silicate resinous product.

The components may be mixed in any suitable manner; they may be prereacted to produce alkali metal hydroxyl organic silicates or alkali metal carboxylic acid silicates, then reacted with the other component.

The reaction of this invention may take place under any suitable physical conditions. While most of the reactions will take place at ambient pressure, in certain cases, a pressure either lower than, or above, ambient pressure may give better results. It may be preferable in certain cases to use temperatures above the polyol's boiling temperature after a partial reaction has taken place in order to speed up the chemical reaction. The temperature usually ranges between 150° C. to 250° C.

The ratios of the essential reactants and optional reactants which lead to the alkali metal unsaturated polyester silicate resinous product of this invention may vary, broadly speaking, within ranges as follows:

(a) 1 to 10 parts by weight of alkali metal;
(b) 10 to 30 parts by weight of a polyhydroxyl organic compound;
(c) 10 to 30 parts by weight of an unsaturated polycarboxylic acid and/or unsaturated polycarboxylic acid anhydride.

The ratio of the reactants which lead to the alkali metal unsaturated polyester silicate-vinyl monomer resin and unsaturated polyester silicate-vinyl monomer resins of this invention may vary, broadly speaking, with ranges as follows:

(a) 20% to 50% by weight of a vinyl monomer;
(b) up to 1% by weight of a peroxide initiator;
(c) 0.05% to 0.5% by weight of a promoter;
(d) 0.05% to 0.5% by weight of an activator.

Percentage based on the weight of the alkali metal unsaturated polyester silicate vinyl monomer resin or unsaturated polyester silicate-vinyl monomer resin. The amount of peroxide initiator and activator needed to initiate the chemical reaction is quite varied and only a catalytic amount is necessary in this invention.

In the process to react a salt-forming compound with the alkali metal unsaturated polyester silicate resinous product, the salt-forming compound is added an amount wherein the acid radicals are about equal to the alkali metal radical.

Water-binding components may be used in this invention, including organic or inorganic water-binding substances which have, first, the ability to chemically combine, preferably irreversibly, with water and, second, the ability to reinforce the unsaturated polyester silicate plastics of the invention. The term "water-binding component" is used herein to identify a material, preferably granular or particulate, which is sufficiently anhydrous to be capable of absorbing water to form a solid or gel such as mortar or hydraulic cement.

A water-binding component such as hydraulic cement, synthetic anhydride, gypsum or burnt lime may be added to any of the components to produce a tough, somewhat flexible solid or cellular solid concentrate. The water-binding component may be added in amounts up to 200% by weight, based on the weight of alkali metal unsaturated polyester silicate-vinyl monomer resin.

Suitable hydraulic cements are, in particular, Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate, may be used. There are many kinds of cement which can be used in the production of the compositions of the invention and they are so well known that a detailed description of cement will not be given here; however, one can find such a detailed description in Encyclopedia of Chemical Technology, Volume 4, Second Edition, Published by Kirk-Othmer, pages 684–710, of the type of cement which may be used in the production of this invention and are incorporated herein by reference. Water may be added with the water-binding agent in an amount up to 25% by weight, percentage based on weight of the water-binding agent.

DESCRIPTION OF PREFERRED EMBODIMENTS

My invention will be illustrated in greater detail by the specific Examples which follow, it being understood that these preferred embodiments are illustrative of, but not limited to, procedures which may be used in the production of alkali metal unsaturated polyester silicate resinous products. Parts and percentages are by weight unless otherwise indicated.

Example 1

About 20 parts by weight of phthalic anhydride, 10 parts by weight of maleic and 10 parts by weight of ethylene glycol are mixed, then heated to a temperature between the melting point of phthalic acid and the boiling point of ethylene glycol while slowly adding about 10 parts by weight of sodium metasilicate pentahydrate agitating for 20 to 90 minutes. The temperature may then be gradually increased, up to 250° C., until the desired viscosity is obtained, thereby producing a cream-colored alkali metal unsaturated polyester silicate resinous product.

Example 2

About 20 parts by weight of an aqueous solution of sodium silicate, containing 40 parts by weight of anhydrous sodium silicate are slowly added to a mixture of 30 parts by weight of phthalic acid, 5 parts by weight of diethylene glycol and 10 parts by weight of ethylene glycol, heated to a temperature between the melting temperature of phthalic acid and the boiling temperature of ethylene glycol while agitating for 20 to 90 minutes. The temperature is then gradually increased, up to 250° C., while agitating until the desired viscosity is obtained, thereby producing an alkali metal unsaturated polyester silicate resinous product.

Other glycols may be used in place of ethylene glycol such as propylene glycol, butylene glycol, dipropylene glycol, polyethylene glycol, polypropylene glycol, and mixtures thereof.

Example 3

About 10 parts by weight of potassium metasilicate pentahydrate are slowly added to a mixture of 15 parts by weight of phthalic anhydride, 15 parts by weight of maleic anhydride, 5 parts by weight of ethylene glycol and 10 parts by weight of propylene glycol are heated to a temperature between the melting temperature of the polycarboxyl acids and the boiling temperature of the polyols while agitating for 20 to 90 minutes, thereby producing an alkali metal polyester silicate resinous product. The temperature is then gradually increased up to 250° C., while agitating until the desired viscosity is obtained. The resinous product may be produced as a thick liquid or a hard solid.

The thick liquid (viscosity of 500 to 1,500 poises) is mixed with styrene in the ratio of about 2 to 1 parts by weight. Then a catalytic amount of a peroxide initiator, methyl ethyl ketone peroxide (0.2 to 0.5 part by weight), and an activator, cobalt naphthenate (30 to 100 ppm of cobalt metal), are added and mixed at a temperature of 20° C. to 60° C., thereby producing a hard, solid condensation product. The above solution may be applied to a fiber glass cloth to produce rigid sheets and may be used to build containers, roofing, etc.

Example 4

About 10 parts by weight of sodium metasilicate pentahydrate are slowly added to a mixture of 15 parts by weight of diethylene glycol, 30 parts by weight of phthalic anhydride and 10 parts by weight of maleic anhydride heated to a temperature just below the boiling temperature of diethylene glycol (150° C. to 250° C.) for 20 to 90 minutes while agitating at ambient pressure, thereby producing a cream-colored alkali metal unsaturated polyester silicate resinous product.

A mineral acid, sulfuric acid, is then added slowly to the alkali metal unsaturated polyester silicate resinous product in the amount wherein the sulfuric acid and alkali metal radicals are about equal, while agitating, thereby producing a polyester silicate resinous product. This product is soluble in common solvents such as acetic acid and the solution of polyester silicate may be painted on wood to produce a tough protective coating when dried.

Other polycarboxylic acids may be used in place of phthalic anhydride, such as phthalic acid, maleic acid, maleic anhydride, succinic acid, succinic anhydride, glutaric anhydride, glutaric acid, poly(idipic anhydride), adipic acid, tetrachlorophthalic anhydride, diglycolic anhydride, fumaric acid, azelaic acid, sebacic acid, terephthalic acid, oxalic acid, itaconic acid, nitrophthalic acid anhydride, pyromellitic anhydride, tetrahydrophthalic anhydride, dodecenylsuccinic anhydride, hexadecylsuccinic anhydride and mixtures thereof. Other mineral acids such as hydrochloric acid and phosphoric acid may be used in place of sulfuric acid.

Example 5

About 30 parts by weight of the alkali metal unsaturated polyester silicate, as produced in Example 3, 10 parts by weight of methyl methacrylate, 0.2 to 0.5 part by weight of methyl ethyl ketone peroxide and sufficient cobalt naphthanate to produce 100 ppm are mixed at ambient pressure and at a temperature between 20° C. and 60° C., thereby producing a tough, solid alkali metal polyester silicate resinous product.

Example 6

About 30 parts by weight of the alkali metal unsaturated polyester silicate as produced in Example 3 and 10 parts by weight of styrene are mixed to produce a liquid then 0.2 to 0.5 part by weight of methyl ethyl ketone peroxide and sufficient cobalt naphthanate to produce 100 ppm are added and thoroughly mixed at 24° C. The mixture hardens in 20 to 60 minutes.

Example 7

About 25 parts by weight of the unsaturated polyester silicate resinous product as produced in Example 4 are mixed with eight parts by weight of styrene and 2 parts by weight of vinyl acetate to form a liquid unsaturated polyester silicate-vinyl monomer resin; then about cobalt naphthanate and manganese chloride in amount of 30 to 100 parts by million of each is added and mixed; to this mixture 0.3 parts by weight of benzoyl peroxide is added and thoroughly mixed and applied to a table top. The mixture hardens to form a tough coating agent.

Example 8

About 10 parts by weight of maleic anhydride, 10 parts by weight of adipic acid and 10 parts by weight of diethylene glycerol are mixed then heated to about 150° C. then a sodium silicate hydrated powder ($Na_2O:SiO_2$ ratio of 1:2) is slowly added while agitating for 20 to 90 minutes thereby producing a soft solid alkali metal unsaturated polyester silicate resinous product. About 10 parts by weight of styrene is added to the hot resinous product at a temperature just below the boiling point of styrene and thoroughly mixed until a solution is formed.

About 0.2 parts by weight of an inhibitor, hydroquinone, and 0.05 parts by weight of cobalt napthanate are thoroughly mixed with the resin; then 0.5 parts by weight of a solution of methyl ethyl ketone peroxide is thoroughly mixed with the resin and applied to a layer of fiberglass cloth. The resin hardens to produce a panel which may be used in construction.

Example 9

10 parts by weight of the alkali metal unsaturated polyester silicate resinous product as produced in Example 4, 5 parts by weight of styrene and cobalt naphthenate in an amount to give 30-100 ppm of cobalt metal are thoroughly mixed to produce a solution; then the solution is mixed with 30 parts by weight of Portland cement, 8 parts by weight of water and 0.2 parts by weight of benzoyl peroxide are mixed at ambient temperature (about 24° C.) then applied to layers of fiberglass. The mixture hardens in a short time to produce a rigid panel which may be used in construction, boats, etc.

Other water-binding agents may be used in place of Portland cement such as other hydraulic cements, gypsum, burnt lime and synthetic anhydrites.

Example 10

Example 9 is modified wherein the unsaturated polyester silicate resinous product produced in Example 4 is used in place of the alkali metal unsaturated polyester silicate resinous product.

Although specific materials and conditions were set forth in the above examples, these were merely illustrative of preferred embodiments of my invention. Various other compositions, such as the typical materials listed above may be used, where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended claims.

I claim:

1. The process for the production of alkali metal unsaturated polyester silicate resin by the following steps:
   (a) mixing 10 to 30 parts by weight of a polyhydroxyl organic compound and 10 to 30 parts by weight of an unsaturated polycarboxylic compound selected from the group consisting of polycarboxylic acid, polycarboxylic acid anhydride and mixtures thereof,
   (b) adding slowly 1 to 10 parts by weight of alkali metal silicate to the mixture while agitating and heating the mixture at a temperature between the melting temperature of the unsaturated polycarboxylic acid compound and the boiling temperature of the polyhydroxyl organic compounds while agitating for 20 to 90 minutes, thereby
   (c) producing an alkali metal unsaturated polyester silicate resinous product,
   (d) adding a vinyl monomer, selected from the group consisting of vinyl acetate, styrene, methacrylic acid, methyl methacrylate, vinyl toluene, acrylic acid, acrylonitrile, divinyl benzene and mixtures thereof, in the amount of 20 to 50 percent by weight, percentage based on the weight of the alkali metal unsaturated polyester resinous product, thereby,
   (e) producing an alkali metal unsaturated polyester silicate resin.

2. The process of claim 1 wherein an additional step is taken wherein a catalytic amount of peroxide initiator selected from the group consisting of organic peroxides, inorganic peroxides, alkali metal persulfates and mixtures thereof, and an activator are added and are thoroughly mixed and reacted.

3. The product produced by the process of claim 1.

4. The process of claim 1 wherein the alkali metal silicate is selected from the group consisting of sodium silicate, potassium silicate, lithium silicate and mixtures thereof.

5. The process of claim 1 wherein the alkali metal silicate is sodium silicate.

6. The process of claim 1 wherein the polyhydroxyl organic compound is selected from the group consisting of ethylene glycol, propylene glycol, trimethylene glycol, tetramethylene glycol, polyethylene glycol, polypropylene glycol, polybutylene glycol, bis(B-hydroxyethyl) terephthalate, Bisphenol A, resorcinol and mixtures thereof.

7. The process of claim 1 wherein the unsaturated polycarboxylic acid is selected from the group consisting of maleic acid, fumaric acid, itaconic acid and mixtures thereof.

8. The process of claim 1 wherein the unsaturated polycarboxylic acid anhydride is maleic anhydride.

9. The process of claim 1 wherein up to 75 percent of the unsaturated polycarboxylic acid or unsaturated polycarboxylic acid anhydride is replaced with a polycarboxylic acid selected from group consisting of phthalic acid, succinic acid, oxalic acid, malonic acid, glutaric acid, adipic acid, pimelic acid, suberic acid, isophthalic acid, azelaic acid, sebacic acid, terephthalic acid, diglycolic acid, tartaric acid, and mixtures thereof.

10. The process of claim 1 wherein up to 75 percent by weight of the unsaturated polycarboxylic acid or polycarboxylic acid anhydride is replaced with a polycarboxylic acid anhydride selected from the group consisting of phthalic acid anhydride, succinic acid anhydride, glutaric acid anhydride, poly(adipic anhydride), tetrachlorophthalic acid anhydride, pyromellitic anhydride, tetrahydrophthalic anhydride, dodecenylsuccinic acid anhydride, hexadecysuccinic anhydride, nitrophthalic acid anhydride and mixtures thereof.

11. The process of claim 1 wherein up to 75% of the polycarboxylic acid or polycarboxylic acid anhydride is replaced with a linear organic carbonate selected from the group consisting of p-xylene glycol bis(ethyl carbonate), diethylene glycol bis(allyl carbonate) and mixtures thereof.

12. The process of claim 2 wherein the peroxide initiator is selected from the group consisting of acetyl benzoyl peroxide, methyl ethyl ketone peroxide, cyclohexanone peroxide, cyclohexyl hypoperoxide, 2,4-dichlorobenzyl peroxide, cumene hypoperoxide, tert-butyl hypoperoxide, methyl amyl ketone peroxide, benzoyl peroxide, tert-butyl perbenzoate, di-tert-butyl diperphthalate, p-chlorobenzoyl peroxide, dibenzal diperoxide, benzoyl peroxide and mixtures thereof in an amount up to 1 percent by weight, percentage based on the alkali metal unsaturated polyester-vinyl monomer resin.

13. The process of claim 2 wherein the peroxide initiator is methyl ethyl ketone peroxide in the amount of 0.2 to 0.5 percent by weight, percentage based on the weight of the alkali metal unsaturated polyester silicate-vinyl monomer resin and the activator is cobalt naphthanate in the amount of 30 to 100 ppm of cobalt metal.

14. The process of claim 1 wherein an additional step is taken after step (e) of claim 1 wherein up to two parts by weight of a water-binding agent selected from the group consisting of hydraulic cement, synthetic anhydride, gypsum and burnt lime, 1 part by weight of the alkali metal unsaturated polyester silicate resin of step (e) of claim 1, up to 25% by weight of water, percentage based on the weight of the water-binding agent, and a catalytic amount of a peroxide initiator and an activator are added, thoroughly mixed and reacted.

15. The process of claim 1 wherein the alkali metal unsaturated polyester silicate resinous product produced in step (c) of claim 1, is reacted with a salt-forming compound selected from the group consisting of sulfuric acid and hydrochloric acid in an amount wherein the alkali metal radicals are about equal to the acid radical, thereby producing an unsaturated polyester silicate resinous product, then the vinyl monomer is added in step (d) of claim 1 thereby producing an unsaturated polyester silicate-vinyl monomer resin in step (e) of claim 1.

16. The product produced by the process of claim 15.

* * * * *